United States Patent [19]  
Hartmann et al.

[11] 4,216,275  
[45] Aug. 5, 1980

[54] ELECTROCHEMICAL STORAGE CELL OR BATTERY

[75] Inventors: Bernd Hartmann; Wilhelm Haar, both of Sandhausen; Wilfried Fischer, Neckargemünd; Roland Bauer, Hemsbach, all of Fed. Rep. of Germany

[73] Assignee: Brown, Boveri & Cie AG, Mannheim, Fed. Rep. of Germany

[21] Appl. No.: 915,132

[22] Filed: Jun. 13, 1978

[51] Int. Cl.² .............................................. H01M 6/20
[52] U.S. Cl. .................................... 429/104; 429/176
[58] Field of Search ................................. 429/104, 176

[56] References Cited

U.S. PATENT DOCUMENTS

| 3,413,150 | 11/1968 | Kummer et al. | 429/104 |
| 4,024,320 | 5/1977 | Gibson et al. | 429/104 |
| 4,037,027 | 7/1977 | Desplanches et al. | 429/104 |
| 4,117,209 | 9/1978 | Markin et al. | 429/104 |

FOREIGN PATENT DOCUMENTS 1455031  11/1976  United Kingdom .................... 429/104

Primary Examiner—Donald L. Walton  
Attorney, Agent, or Firm—Herbert L. Lerner

[57] ABSTRACT

An electrochemical storage cell or battery with one anode chamber containing molten alkali metal as the anolyte and one cathode chamber containing sulfur-containing catholyte substance, the anolyte and catholyte separated by an alkali-ion-conducting solid electrolyte. The cathode chamber is bounded by a cellwall having a protective layer of a light weight metal also serving as a current collector. The light weight metal in the regions in contact with the catholyte is coated with a metallic alloy which under conditions of operation has certain properties of adhesion, conduction, resistance, corrosion and solubility.

2 Claims, 1 Drawing Figure

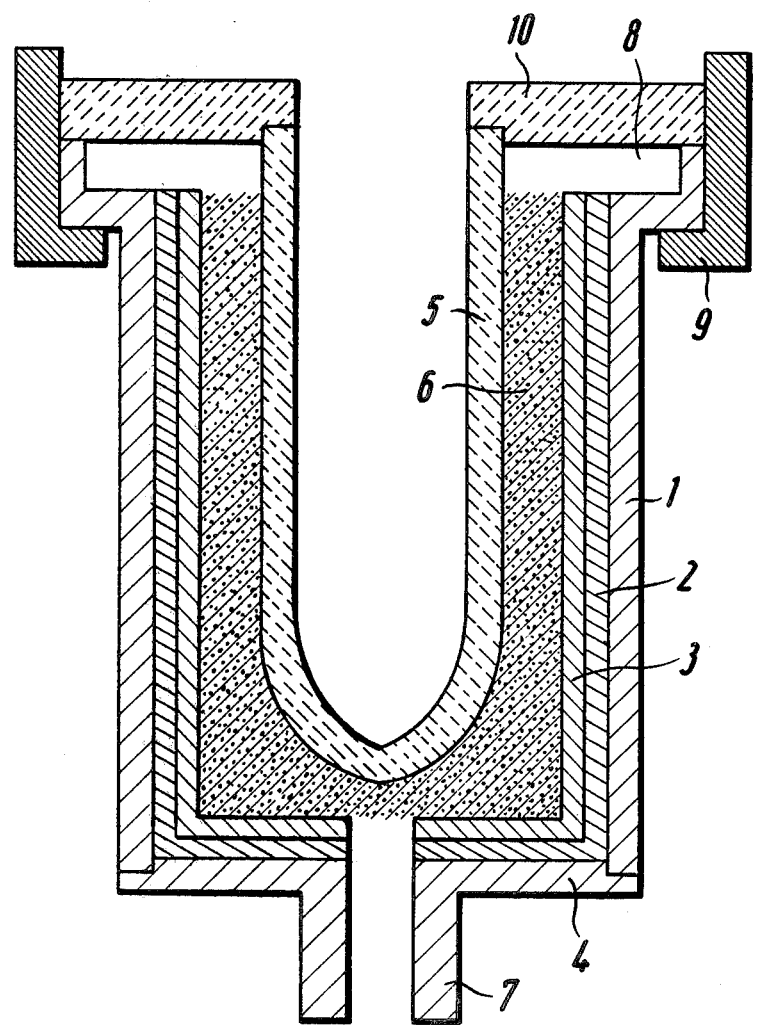

ically hard to overcome and cannot be fully explained here, particularly after it corroded under operating conditions is essential for the functionality of the storage cells. If the conductivity of the corroded protective coat is lower, the inner resistance of the storage cell grows too fast. The restriction concerning the formation of cohesive corrosion layers with a resistance of approximately 2Ωcm² on the light metal is based on the same reason. The production of cohesive corrosion layers on the light metal should be prevented, because cohesive layers create capacities which have a negative influence on the discharging behavior. If the corrosion layers of the protective coat become too soluble in the catholyte substance, this could lead to the separation of metal on the solid electrolyte and possibly to a shortcut. Therefore the solubility of the corrosion products of the protective coat has to be smaller than 10 mg per gram of catholyte substance. According to a further feature of the invention the thickness of the protective coating of metallic alloy is over 50 μm. For technical reasons a coating of up to 200 μm can be applied. A coating with a thickness between 50 and 200 μm fulfills all important functions of the coating and takes care that enough material is provided for the corrosion losses during long periods of use.

As a metallic alloy, according to an additional feature of the invention, one uses preferably the alloys of elements of the 4th to 7th auxiliary groups (Ti, V, Cr, Mn, Zr, Nb, Mo, Hf, Ta, W, Re) with sulfur, selenium, or tellurium. The compositions of the alloys are adjusted according to the specific application; however, the composition has to be of such a nature that the conductivity of the alloy is large enough, and that it remains in the corroded state above the value of 0.03Ω⁻¹cm⁻¹. For the metallic alloys the compounds TiS, TiS₂, VS, V₃S₄, V₂S₃, CrS, Cr₇S₈, Cr₅S₆, Cr₂S₃, Cr₃S₄ and CrS₂ are examples.

Also alloys with non stoichiometrical compositions, such as Cr₁-xS with 0≦x≦0.15, have very good properties and can be adjusted according to the application case.

Further chrome-sulfide alloys within the limits of CrS₂ and Cr₂S₃ have particularly good electrical conductivity and good adhesion on the light metal, particularly on aluminum. This is probably due to a coherent diffusion coat which develops under operating conditions and which leads to a connection of the sulfide alloy layer and the aluminum layer. Due to the nature of this boundary layer, the corrosion of the sulfide protective coat layer, which is caused by the catholyte substance, does not expand to the interface between the sulfide-protective coat layer and the light metal coat. Furthermore, chromesulfide layers with a CrS₂ to Cr₂S₃ composition have particularly small corrosion losses which improves the life expectancy of such a protective coat.

As already mentioned, the application of protective coating on the light metal cellwall is technically hard to overcome and cannot be fully explained here, particularly, since there is a difficult adjustment of the particular coating to the conditions of application. Among other methods the so-called plasma-arc-procedure turns out to be good. In this process the protective coat materials in the form of powder are fed into a plasma-arc and are set through the arc onto the light-metal cellwall. This method makes it possible to produce thicker layers in a relatively short amount of time and assures a good connection of the protective coat layer with the light metal.

Referring now to the drawings the illustrated storage cell consists of a housing, in which a cup-shaped cellwall 1 of aluminum metal is built, with a bottom 1a of the same material. The cellwall 1 and the bottom 1a form the cathode chamber 2, which is filled with catholyte substance of sulfur or sodium polysulfide melt. Within the cathode chamber 2 and with a certain distance to the cellwall 1 a solid electrolyte tube 3 made of β-alumina is disposed with its opening extending through the bottom 1a. The solid electrolyte tube 3 is filled with sodium, as the anolyte substance which has been omitted from the drawing for reasons of simplicity. The solid electrolyte tube 3 is connected through the closing disc 4 with the cellwall 1a as well as with a pole piece 5 which serves as connection to the anode. The connection to the cathode is made through the electrical connection which is attached to the cellwall 1.

On the inner side of the cellwall 1, including the bottom 1a, a protective coat 6 of chrome-sulfide is provided. The chrome-sulfide coat 6 has a composition between CrS₂ and Cr₂S₃ and has been deposited through the plasma-arc-procedure in a thickness of 100 μm. This protective coat 6 takes care that the cellwall 1 including bottom 1a of the cup-shaped cell housing, which serves simultaneously as current collector, is not destroyed by the corrosion effects of the catholyte substance filling out the cathode chamber 2. Under the operating conditions of the storage cell, the chrome-sulfide coat which originally had a composition between CrS₂ and Cr₂S₃, and which corrodes to a composition close to Cr₂S₃, has a specific conductivity over 0.03Ω⁻¹cm⁻¹ and a good adherence to the light metal cellwall. This is due to the diffusion-interlayer, which contains chrome, sulfur and aluminum which is developing under the operating conditions of the storage cell, and which connects the chrome-sulfide protective coat 6 with the light metal of the cellwall 1 and the bottom 1a. Therefore such corrosion processes, which might result through the contact of the protective coat 6 with the catholyte substance do not expand to the light metal.

The foregoing is a specification setting forth the preferred embodiment of the invention as considered at the present. It is, however, to be understood that the invention can be practiced otherwise than as specifically illustrated and described within the scope of the appended claims.

I claim:

1. In an electrochemical storage cell or battery including at least one anode chamber containing alkali metal as the anolyte and at least one cathode chamber containing a sulfur-containing catholyte substance, with the anode chamber and the cathode chamber separated from each other by an alkali-ion conducting solid electrolyte, and with the cathode chamber bounded by a cellwall of a lightweight metal having a protective layer which wall also serves as current collector, including coating the light weight metal, at least in the region which is in contact with the catholyte substance in the cathode chamber, with corroded condition is still quite sufficient to assure good electrical properties of the cell.

On the other hand, it is important that the corroded layer which is formed, sets up a sufficient large resistance against diffusion of aluminum, so that the aluminum is prevented from forming a significant amount of $Al_2S_3$, which, because of its high resistance, is particularly detrimental, or to form similar corrosion products with a resistance above $2\Omega cm^2$. Finally, the alloy intended for the protective coating should be characterized by the property of the layer generated by the corrosion not dissolving in the catholyte substance, i.e. the corrosion products have a certain maximum solubility in the catholyte substance. Some of the previous known attempts failed by not meeting the above mentioned criterion.

Different types of alloys having the desired properties for use as a protective coating on cellwalls may be selected. In general, alloys are applicable which on a base of nickel or cobalt contain suitable amounts of chromium, cobalt, nickel, molybdenum or tungsten. Various high-grade steels and so called super-alloys also belong in this category. Some of these alloys have become known for housings of sodium sulfur cells, but are not known in connection with protective coatings on light metal, and not in regard to the special aspects of this invention.

During the investigations for the invention at hand, an alloy was found which proved to be particularly advantageous as protective layer. Such alloy contains at least one metal from the group iron, cobalt or nickel, and such alloy also contains 10 to 50 weight % chromium, preferably 20 to 30 weight % chromium. below 10 weight % chromium there seems to be no cohesive protective layer, while at chromium contents above 50 weight % the protective effect of the layer diminishes, apparently due to formation of chromium sulfides which exhibit a less advantageous behaviour. In the preferred region of 20 to 30% weight of chromium, chromium stratum and some sulfides seem to be formed which effect very dense, well protecting sub-layers.

The metallic alloys which are used as coating, according to the invention, are therefore at least partly sulfided by the melt of the cathode chamber. In contrast to the sulfidation of the light weight metals the hereby formed corrosion products such as heavy metal sulfides and thiospinel are not detrimental to the cell performance since they are not only of poorer solubility in the melt but also exhibit better conductivity for electric current than the corresponding products of the unprotected light metal. As experiments have shown, the coating must not form an absolute dense cover-layer since the light metal itself is also to a great extent corrosion resistant.

In the following, two embodiments are explained with the aid of the cup-shaped storage cell shown in the drawing. Referring to the drawing, a container made of aluminum serves as housing 1. The container was manufactured as follows: Before applying the coating, the individual parts were provided with an undercoating of 96% nickel and 4% aluminum, designated by the numeral 2. Thereafter, the coating with the protective layer is applied, indicated by the number 3, namely, with a super-alloy consisting of 56.71 weight % nickel, 18.4 weight % cobalt, 12.3 weight % chromium, 3.25 weight % molybdenum, 5 weight % aluminum and 4.33 weight % titanium. Both layers were applied by conventional plasma-spraying with a device called Plasmadyne, 36 kW. Argon was used as the plasma gas and a current strength of 500 A at 35 V was used. The parts, after being treated as described, are then combined by electron beam welding. The bottom designated by 4 in the drawing, was manufactured in the same way.

Obviously, the above-described manufacturing method can be replaced by more sophisticated methods. Between the cellwall or housing at its interior protective coating 3 and the solid electrolyte 5, is the cathode chamber, which, as usual, is filled with graphite felt 6. The short tube 7, serves for evacuation, if desired, of the catholyte substance in the cathode chamber. The sealing means 8 which is made of aluminum, and which is connected to the housing 1, is pressed onto the $Al_2O_3$ ring 10 with the help of the retainer flange 9. In this way, the cathode chamber is sealed from the atmosphere.

In the following, a comparison is made between a sodium-sulfur cell with a housing consisting of steel, and one made according to the instant invention. Both cells follow generally the construction shown in the drawing. The electrolyte tube has a length of 220 mm, a diameter of 25 mm and a wall thickness of ca. 1 mm. The distance between the electrolyte tube and the housing wall is 7 mm. In both cells of the example, a coating of the same material whose composition was given above, is in contact with the melt.

The thickness of the housing wall is 1 mm. In the steel cell, in contrast to the drawing, the seal is constructed according to German Published Non-Prosecuted Application 24 59 530.

From such cells, one can take out 100 Wh during a discharge time of two hours.

The weight of the steel cell is ca. 1 kg, the weight of the coated aluminum cell is ca. 50 g. This clearly proves the advantage of using aluminum with respect to weight energy density.

Both cells reached a capacity of $78\pm2\%$ at a charging current density of 75 mA/(cm$^2\beta$ Al$_2$O$_3$), when treated by an addition of 0.8 mole % tetracyano-ethylene (German Published Non-Prosecuted Application 2 633 456 and U.S. Application Ser. No. 817,378 now abandoned, filed July 20, 1977, assigned to Brown, Boveri and Cie Aktiengesellschaft, the assignee of the present invention), which capacity remained constant within limits of error through 100 cycles. Thus, the two cells compared are equivalent with respect to capacity and aging.

In the case of an aluminum housing coated according to the state of the art, the results are inferior to that of the present invention. In a cell whose housing consisted of aluminum coated by plasma-spraying with molybdenum, whereby the molybdenum was then by contact with sulfur changed to $MoS_2$ at a discharge current of 75 mA/cm$^2$ (referred to the electrolyte surface) a cell potential of only 1.75 volt resulted, whereas in a cell constructed according to the invention, the cell potential was considerably higher at equal discharge current density, namely 1.88 volt. This potential remained constant over more than 100 cycles.

In a cell with an aluminum housing which had been coated with graphite by evaporation in a vacuum, the cell potential was 1.7 volt in the beginning at 75 mA/cm$^2$, and after several cycles only a cell potential of 1.4 volt could be reached at 35 mA/cm$^2$.

A comparison with a cellwall not coated with aluminum is not possible because when the cellwall is used as a current collector, the uncoated aluminum corrodes so, rapidly and thereby the interior resistance of the cell rises so much due to the strongly insulating aluminum sulfide, that the cell as a practical matter is not operative.

There is claimed:

1. In an electrochemical storage cell or battery with at least one anode chamber containing alkali metal as the anolyte and at least one cathode chamber containing a sulfur-containing catholyte substance, with the anode chamber and the cathode chamber separated from each other by an alkali-ion conducting solid electrolyte, and with the cathode chamber bounded by a cellwall of a lightweight metal having a protective layer, which wall also serves as current collector, the improvement comprising, coating the light weight metal, at least in the region which is in contact with the catholyte substance in the cathode chamber, first with a prime coat of nickel and aluminum, and then onto said prime coat applying a metallic alloy having at least one metal selected from the group consisting of iron, cobalt and nickel, and with the alloy containing from 20 to 30 weight % of chromium, and in the absence of any additional coating covering said coating of metallic alloy which, under the conditions of operation, has properties
  (a) of adhering to the light weight metal of the cellwall,
  (b) of a good conductor for electric current, said alloy exhibiting, in the corroded condition resulting from conditions of operation, a minimum conductivity of ca. 0.03 $\Omega^{-1}cm^{-1}$,
  (c) prevents the formation of a cohesive layer of aluminum sulfide and other corrosion products with a resistance greater than 2 $\Omega$ cm$^2$ and
  (d) the corrosion products resulting from the conditions of operation have a solubility of less than 10 mg/g melt in the catholyte substance.

2. In an electrochemical storage cell or battery with at least one anode chamber containing alkali metal as the anolyte and at least one cathode chamber containing a sulfur-containing catholyte substance, with the anode chamber and the cathode chamber separated from each other by an alkali-ion conducting solid electrolyte, and with the cathode chamber bounded by a cellwall of a light weight metal having a protective layer, which wall also serves as current collector, the improvement comprising, coating the light weight metal, at least in the region which is in contact with the catholyte substance in the cathode chamber, first with a prime coat of 96% nickel and 4% aluminum, and then onto said prime coat applying a metallic super-alloy consisting of 56.71 weight % nickel, 18.4% cobalt, 12.3% chromium, 3.25% molybdenum, 5% aluminum, 4.33% titanium, and which super-alloy under the conditions of operation has good adhesive properties to the light weight metal and is a good conductor for electric current, and exhibits in the corroded condition resulting from conditions of operation, a minimum conductivity of 0.03 $\Omega^{-1}cm^{-1}$, and whose corrosion products resulting from the conditions of operation have a solubility of less than 10 mg/g melt in the catholyte substance.

* * * * *